United States Patent [19]  [11]  4,155,647
Michel  [45]  May 22, 1979

[54] OPTICAL APPARATUS FOR BALLISTIC MEASUREMENTS

[75] Inventor: Dieter Michel, Kammer, Fed. Rep. of Germany

[73] Assignee: Firma Dr. Johannes Heidenhain GmbH, Traunreut, Fed. Rep. of Germany

[21] Appl. No.: 771,561

[22] Filed: Feb. 24, 1977

[30] Foreign Application Priority Data

Mar. 13, 1976 [DE] Fed. Rep. of Germany ....... 2610708

[51] Int. Cl.² .............................................. G01P 3/36
[52] U.S. Cl. ........................................ 356/28; 73/167; 331/94.5 T; 350/162 R
[58] Field of Search ............. 73/167, 488; 350/162 R, 350/168; 331/94.5 T; 356/28, 111, 113

[56] References Cited

U.S. PATENT DOCUMENTS

| 2,769,492 | 11/1956 | Ostergren | 356/28 |
| 3,495,893 | 2/1970 | Geusic et al. | 356/113 |
| 3,524,354 | 8/1970 | Frank et al. | 356/28 |
| 3,675,030 | 7/1972 | Tanenhaus | 356/28 |
| 3,695,749 | 10/1972 | Stapleton | 350/162 R |
| 3,830,568 | 8/1974 | Allen | 356/28 |
| 3,865,487 | 2/1975 | Andermo | 356/28 |
| 3,989,378 | 11/1976 | Heitmann et al. | 356/28 |

FOREIGN PATENT DOCUMENTS

| 2163234 | 6/1973 | Fed. Rep. of Germany | 356/5 |
| 2259371 | 8/1975 | France | 356/111 |

OTHER PUBLICATIONS

F. A. Jenkins et al., *Fundamentals of Optics*, 3rd ed., McGraw-Hill, 1957, pp. 239-240.

*Primary Examiner*—S. C. Buczinski
*Attorney, Agent, or Firm*—John J. Pavlak; Gary M. Ropski

[57] ABSTRACT

An optical apparatus, particularly suited for use in a ballistic measurement device, including a laser generating a laser beam, an optical means for expanding the laser beam in a plane, and an optical element, positioned between the laser and the optical means, for dividing the laser beam into a plurality of beams of substantially identical intensity so that a substantially uniform brightness results over the entire angle of divergence of the laser beam.

According to another embodiment, the optical apparatus is used in a photoelectric apparatus for ballistic measurement, such as velocity of moving projectiles, further including means for deflecting the expanded laser beam to produce a second laser beam parallel to and spaced from the expanded laser beam by a predetermined distance, a photoelectric converter positioned so that the second laser beam impinges upon the converter, and an evaluation circuit responsive to an output of the converter to measure the time delay between interruptions of the first and second laser beams by a moving projectile.

8 Claims, 8 Drawing Figures

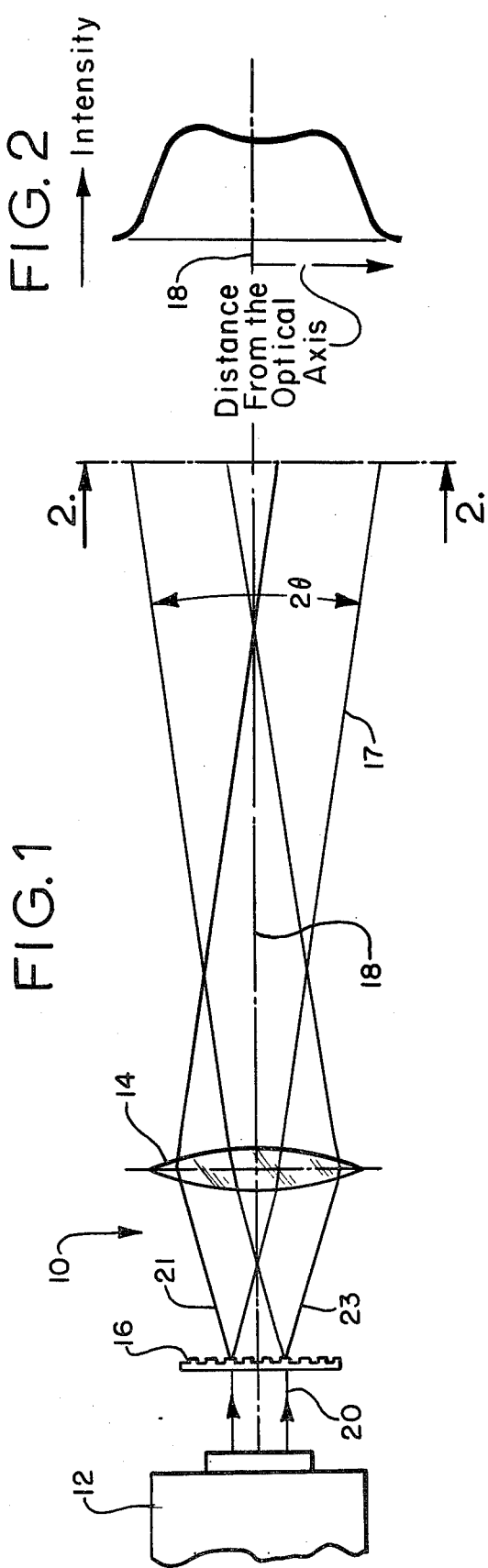

4,155,647

OPTICAL APPARATUS FOR BALLISTIC MEASUREMENTS

BACKGROUND OF THE INVENTION

1. Field of the Invention

The invention relates to an optical apparatus which is provided with a laser and optical means for expanding a laser beam output in a plane. In particular, the invention relates to an optical apparatus which also includes an optical element which divides the laser beam into several beams of preferably identical intensity. The optical apparatus is particularly suited for use in a ballistics device.

2. Description of the Prior Art

In the prior art apparatus for expanding a coherent laser beam output typically comprise a cylindrical lens positioned along the optical axis of the laser beam. This arrangement in the prior art has the disadvantage of a decreasing intensity of the laser beam with increasing angle of divergence of the laser beam from its optical axis. This effect is due to the Gaussian distribution of intensity of the laser beam over its cross-section, symmetrical about the optical axis of the laser. Such a decrease in intensity away from the optical axis is undesirable in many laser applications, particularly in ballistics devices used to optically measure characteristics of moving projectiles.

SUMMARY OF THE INVENTION

According to the present invention, an optical apparatus is provided which overcomes the disadvantages of the prior art with respect to decreasing intensity of the laser beam with increasing angle of divergence. This optical apparatus of the invention includes a laser producing a laser beam output, an optical means for expanding the laser beam in a direction perpendicular to its optical axis, and an optical element positioned between the laser and the optical means. This optical element divides the laser beam into several beams of preferably identical intensity, so that a substantially uniform degree of brightness results over the entire angle of divergence of the laser beam. The optical element is preferably an amplitude or phase grid diffraction grating, or a double refraction prism, such as a Wollaston prism.

According to another embodiment of the invention there is provided an optical apparatus for ballistic measurement, such as the velocity of moving projectiles. In addition to the elements of the optical apparatus described above, this optical apparatus for ballistic measurement includes means for deflecting the expanded laser beam output of the optical apparatus to produce a second laser beam parallel to and spaced from the expanded laser beam by a predetermined distance, a photoelectric converter positioned so that the second laser beam impinges upon the converter, and an evaluation circuit responsive to an output of the converter to measure the time delay between interruptions of the first and second laser beams by a moving projectile.

Accordingly, the present invention has the advantage of providing an optical apparatus which produces an expanded laser light beam with a substantially uniform intensity over the angle of divergence of the beam. Additional advantages include high measuring precision, elimination of most measuring errors, and relatively low cost of construction.

Other advantages, objects, and features of the present invention will become apparent upon reading the following detailed description of the preferred embodiments in conjunction with the accompanying drawings.

BRIEF DESCRIPTION OF THE DRAWINGS

FIG. 1 is a schematic view of an optical apparatus of the present invention.

FIG. 2 is a graph of the intensity of a laser output of the optical apparatus of FIG. 1 measured along line 2—2.

FIG. 3 is a schematic view of a ballistics device, used to measure the velocity of projectiles, embodying an optical apparatus of the present invention.

FIG. 4 is a cross-sectional schematic view of the ballistics device of FIG. 3 taken along line 4—4.

DESCRIPTION OF THE PREFERRED EMBODIMENTS

Figure 5:
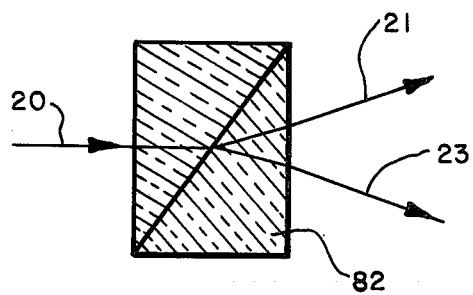
FIG. 5 is a cross-sectional view of a double refraction prism used in an embodiment of the present invention.

Referring now to the drawings, and more particularly to FIG. 1, there is illustrated an optical apparatus according to the present invention and indicated generally by reference numeral 10. The optical apparatus includes a laser 12 which produces a laser beam output 20, a cylindrical lens 14 for expanding the laser beam output 20 in a plane, and an optical element 16 positioned between the laser 12 and the lens 14. The optical element 16 divides the laser beam 20 into a plurality of smaller laser beams, two of which are indicated by reference numerals 21 and 23. In the preferred embodiment illustrated in FIG. 1, the optical element 16 is preferably a rectangular phase grid diffraction grating. With the insertion of this optical element 16, a substantially constant distribution of brightness is produced over the entire angle of divergence $2\theta$ of the cluster 17 of the laser beams 21 and 23. This substantially constant brightness distribution is graphically shown in FIG. 2 in which the intensity of the laser beam cluster 17 at line 2—2 of FIG. 1 is plotted as a function of distance perpendicularly from the optical axis 18 of the cluster 17. The individual laser beam waveforms interfere constructively to produce this substantially constant intensity, which is desirable in many applications, particularly in ballistics devices used to optically measure characteristics of moving objects, such as projectiles.

Referring now to FIGS. 3 and 4, there is shown a ballistics device embodying an optical apparatus of the present invention. In particular, the ballistics device of this preferred embodiment is a photoelectric arrangement for measuring the speed of moving objects, especially projectiles or other missiles. According to this embodiment of the invention, there is provided a laser 12' which produces a laser output, a first cylindrical lens 14' for expanding the laser beam, and an optical element 16' positioned between the laser 12' and the lens 14'. A second cylindrical lens 42 further flares the laser beam into a relatively thin first beam 22 of laser light with an optical axis indicated by reference numeral 18'. Mirrors 32 and 34 are so positioned that the first relatively thin laser light beam 22 is deflected to produce a second relatively thin laser light beam 24, parallel to first light beam 22, but travelling in the reverse direction of the first light beam 22 and spaced from the first light beam 22 by a precisely predetermined distance S. Although mirrors 32 and 34 are preferred, any suitable optical element may be substituted to deflect the laser light to form two beams.

This second laser light beam 24 is projected through a third cylindrical lens 44 to impinge upon a photoelectric converter 52, such as a photodiode or photocell, which produces an analog output signal. This output is fed to an evaluation circuit, which preferably includes an amplifier 54, a trigger 56, and an electronic counter 60. The amplifier 54 amplifies the output of the photoelectric converter 52, and the trigger 56 transforms the amplified output into rectangular pulses such as starting pulse 58 and stopping pulse 59. The output of the trigger 56 is connected to an electronic counter 60 which in each cycle is started with the occurrence of a starting pulse 58 and stopped with the occurrence of stopping pulse 59.

The velocity of a projectile 70 is determined with the apparatus illustrated in FIGS. 3 and 4 by measuring the flight time T for a predetermined path S. The velocity V is calculated according to the equation $V=S/T$. As shown in FIG. 3, the electronic counter 60 measures the flight time T which is determined by the time delay between the starting impulse 58 and the stopping impulse 59. The starting impulse 58 is generated as the projectile 70 travels through the first laser light beam 22 and the stopping impulse 59 is produced as the projectile 70 passes through the second light beam 24.

According to the preferred embodiment of the invention illustrated in FIGS. 3 and 4 the optical element 16' is provided between the laser 12' and the first cylindrical lens 14' for dividing the collimated laser beam into a plurality of beams, preferably of identical intensity. The effect of this optical element 16' is a uniform distribution of brightness of laser output over the full angle of divergence, as shown in FIG. 2. Systems of interference strips produced during the superposition of the plurality of beams have no disturbing effect upon this arrangement. The optical elements 16 and 16' may be, as shown in FIG. 1, a rectangular phase grid diffraction grating 16. Moreover, elements 16 and 16' may include, for instance, a double refraction prism (for example, a Wollaston prism), geometrically dividing elements such as divider prisms or divider plates, or a diffraction grating in conjunction with a double refraction prism.

Figure 6:
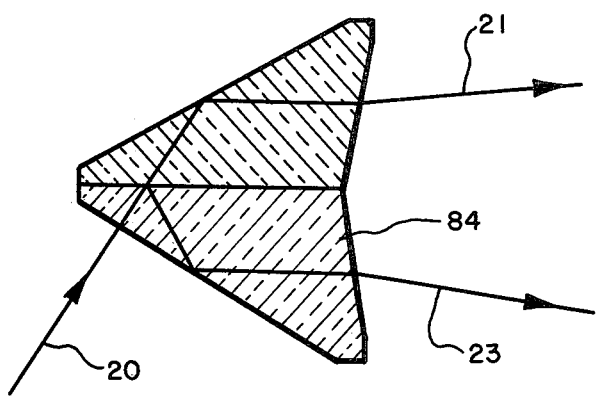
FIG. 6 is a cross-sectional view of a geometrically dividing prism used in an embodiment of the present invention.
Figure 7:
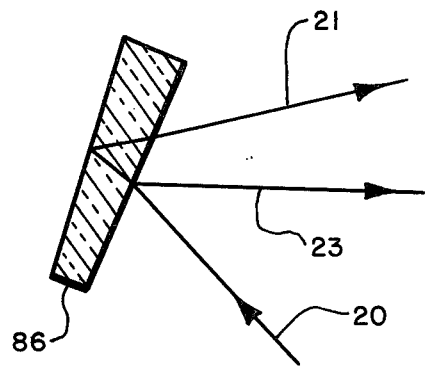
FIG. 7 is a cross-sectional view of a geometrically dividing plate used in an embodiment of the present invention.
Figure 8:
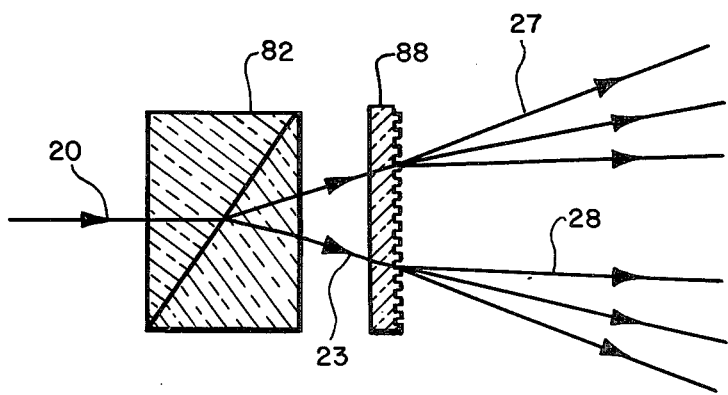
FIG. 8 is a cross-sectional view of a double-refraction prism and a diffraction grating used in an embodiment of the present invention.

FIGS. 5 through 8 show additional types of optical elements 16 and 16' used according to the present invention to divide the laser beam 20 into a plurality of smaller laser beams, two of which are indicated by reference numerals 21 and 23. As shown in FIGS. 5, 6, and 7, the two beams 21 and 23 can be produced by a double refraction prism, such as a Wollaston prism 82, or a geometrically dividing prism 84, or a geometrically dividing plate 86. One skilled in the art would suitably place the incoming laser beam 20 at the various angles illustrated depending upon the particular type of optical element used to produce the two beams 21 and 23. Furthermore, FIG. 8 illustrates the use of a Wollaston prism 82 to produce two laser beams 21 and 23 which impinge upon a diffraction grating 88 and produce additional laser beams clusters 27 and 28.

The optical apparatus of the invention, as illustrated in the preferred embodiment of FIG. 3, offers a number of important advantages, such as: high measuring precision (because the distribution of intensity over the entire angle of divergence $2\theta$ of the laser light cluster 17' is substantially constant); elimination of most measuring errors (because the preferred embodiment uses only one photoelectric converter 52, one amplifier 54, and one trigger 56, whereas prior art arrangements use two separate units to generate two laser light beams with two separate detector systems whose outputs must be phase-corrected); and low cost to build the optical apparatus (because only one laser and one set of the aforementioned elements—photoelectric converter, amplifier, and trigger—is needed).

Though the embodiments hereinbefore described are preferred, many modifications and refinements which do not depart from the true spirit and scope of the invention may be conceived by those skilled in the art. It is intended that all such modifications be covered by the following claims.

I claim:

1. An optical apparatus for ballistic measurements, comprising:

a laser adapted to generate a laser beam;

first optical means for expanding the incoming laser light to produce a first relatively thin flared light beam;

second optical means, positioned between the laser and the first optical means, for dividing the laser beam into a plurality of beams of substantially identical intensity;

means for deflecting the first relatively thin flared light beam to produce a second relatively thin flared light beam parallel to and spaced from the first light beam;

a photoelectric converter positioned so that the second relatively thin flared light beam impinges upon the converter to produce an output; and means for evaluating the output of the photoelectric converter, including an amplifier for receiving and amplifying the output, means for transforming the amplified output into rectangular pulses, and an electronic counter, responsive to the pulses, whereby the time delay between the pulses is measured.

2. The optical apparatus of claim 1 wherein the first optical means includes a pair of cylindrical lenses.

3. The optical apparatus of claim 1 wherein the second optical means includes a diffraction grating.

4. The optical apparatus of claim 1 wherein the second optical means includes a double refraction prism.

5. The optical apparatus of claim 4 wherein the double refraction prism is a Wollaston prism.

6. The optical apparatus of claim 1 wherein the second optical means includes a plurality of geometrically dividing elements.

7. The optical apparatus of claim 6 wherein the geometrically dividing elements are divider prisms.

8. The optical apparatus of claim 6 wherein the geometrically dividing elements are divider plates.

* * * * *